3,169,053
METHOD OF RENDERING FERTILIZER GRANULES NON-CAKING
Edgar W. Sawyer, Jr., Metuchen, and Homer A. Smith, Berkeley Heights, N.J., assignors to Minerals & Chemicals Philipp Corporation, a corporation of Maryland
No Drawing. Filed July 27, 1960, Ser. No. 45,525
4 Claims. (Cl. 71—64)

The present invention has to do with the chemical treatment of kaolin clay to improve its utility as an ingredient in fertilizer compositions for the purpose of obviating the tendency of such fertilizer compositions to cake during storage. The invention relates especially to the use of the treated clay product as an agent to coat granules of a crystalline, hygroscopic fertilizer which is high in available nitrogen content and is difficult to condition effectively with the usual fertilizer salt conditioning agents.

Hygroscopic crystalline material, such as inorganic fertilizer salts, tends to coalesce in the presence of heat, pressure and/or moisture and set up into hard coherent cakes, sometimes appropriately called "tombstones." The phenomenon of caking of hygroscopic solids may be explained as follows. As a result of increase in temperature and/or humidity, hygroscopic fertilizer solids absorb large quantities of water. A portion of the crystals dissolve in this water. With subsequent lowering of temperature and/or humidity, the dissolved material recrystallizes, and the recrystallized material forms a bridge between adjacent crystals and causes coalescence therebetween. Pressure, too, plays its part, since high pressure favors the coalescence of the recrystallized fertilizer material with other crystals. When hygroscopic fertilizer is stored over long periods of time this process repeats itself until the bag or pile of fertilizer becomes a solid coherent mass. Caked fertilizer represents an economic loss since it is difficult or impossible to distribute the fertilizer in such condition.

It has been found that granules, although prone to coalesce, are more resistant to coalescence than comminuted material of like composition since the number of points of contact between fertilizer particles are reduced materially. In many cases bagged fertilizer granules are still hygroscopic and become caked in the bags due to heat, pressure or moisture absorption, such caking seriously impairing the utility of the fertilizer.

Fertilizer granules are generally considered to be effectively conditioned when the granules after storage are free-flowing without application of any pressure thereto or when the granules are readily hand-friable. The demarcation between an acceptable and unacceptable commercial fertilizer salt is most usually established by determining whether the fertilizer is friable and free-flowing after a bag containing granules of the fertilizer is dropped to the ground from a height of about three feet. If the bagged salt is free-flowing after such treatment it is acceptable by the industry. On the other hand, fertilizers are unacceptable when they form cakes which are so hard that mechanical crushing is required to put them into free-flowing condition.

One of the most inexpensive and widely used procedures for preventing the caking of fertilizer granules involves dusting the granules with a powdered moisture absorptive material so as to form a more or less continuous tenacious barrier of absorbent around each of the fertilizer granules. In putting this method into practice, the granules are agitated in the presence of the absorbent in a rotary vessel, such as a rolling drum or rotary dryer, and the powder is permitted to accumulate on the granule surface until a firm compact coating is formed thereon. An absorbent powder is selected which has good adhesion to the granules being conditioned. An important advantage of the aforementioned conditioning technique is that it is relatively easy to effect the desired uniform coating of the fertilizer granule with the dry powdered mineral.

Diatomaceous earth, heat activated attapulgite clay and kaolin clay are among the principal adsorbents used in carrying out this conditioning technique. Of these various adsorbents, kaolin clay enjoys a considerable price advantage. In many instances some, or all of these adsorbents, effectively prevent caking of chemicals or fertilizer when they are used in small quantities, such as about 1 percent by weight of the material to be conditioned. In the case of certain fertilizer compositions, especially those containing urea or water-soluble ammonium salts, such as the sulfate, and especially mixed fertilizer compositions containing these ingredients in appreciable quantities, the aforementioned adsorbents must be employed in considerably greater quantity, usually 3 to 5 percent by weight, in order to obtain effective conditioning. While 3 to 5 percent of adsorbent conditioner might appear to represent a small quantity of diluent, the fact is that plant foods are priced on the basis of the active plant food nutrient content and 3 or 5 percent of diluent represents a marked decrease in the analysis of active plant food nutrient. In some instances, as in the case of 20–0–20 mixed fertilizer granules, clays and diatomaceous earth are not dependable under severe storage conditions, even when used at the 3 to 5 percent level.

Accordingly, a principal object of the present invention is the provision of a clay conditioning agent which is more efficient in preventing the caking of granules of crystalling high nitrogen analysis fertilizer than the naturally occurring clay.

A more particular object of this invention is the provision of a means for improving the effectiveness of certain clay as a conditioning agent for high nitrogen analysis fertilizer salts whereby the clay may be used in smaller quantities than has heretofore been possible and, in some instances, may be used to condition fertilizer granules which were not heretofore amenable to conditioning with clay, even when used in appreciable quantity.

Still another object of this invention is the provision of a simple method for conditioning fertilizer granules with a clay composition containing an organic surface active agent.

These and further objects and advantages will be readily apparent from the description of our invention which follows.

We have discovered that the effectiveness of kaolin clay as a conditioner for high nitrogen analysis crystalline fertilizers is improved when the clay has been previously uniformly coated with a small quantity of an anionic surfactant hereafter described.

Briefly stated, the novel conditioning powder of this invention consists of platelets of kaloin clay which are uniformly coated with from about 1 to 15 percent by weight of an alkali metal salt of an alkylaryl sulfonate surface active agent.

Fertilizer compositions of the present invention comprise free-flowing, discrete granules, the solid core of which comprises a crystalline water-soluble (available) source of nitrogen such as, for example, a water-soluble ammonium salt, urea or 20–0–20 mixed fertilizer salt. uniformly disseminated on the surface of said core and adherent thereto are particles of kaolin clay, the clay particles having previously been coated with a sulfonated surface active agent of the type mentioned above. The conditioned granules are readily produced by dry tumbling the fertilizer granules with the dry, free-flowing surfactant-coated clay particles until the coated clay particles are uniformly distributed on the surfaces of the granules.

High available nitrogen analysis fertilizer salts conditioned in this manner resist forming hard cakes during storage in humid environment. The compositions rerain free-flowing or at most form soft cakes which are readily hand-friable even when stored in humid atmospheres under pressure and/or conditions of fluctuating temperature.

We have found that the effectiveness of kaolin clay as a conditioning agent for high nitrogen analysis fertilizer salts is not improved by coating the clay with all types of surfactants. By way of example, it has been found that when kaolin clay was coated with various hydrophobic cationic surface active agents, such as beta-hydroxyethyl-heptadecenyl glyoxalidine, ("Amine O"), the resultant products appeared to be no more effective as a conditioning agent than the uncoated clay, in spite of the fact that when a similar quantity of the same hydrophobic surface active agents was sprayed directly on certain fertilizer prills a decided conditioning effect was realized. Also, metallic soaps such as magnesium stearate and rosin amine soaps do not produce the desired effect when coated on the clay.

Further, we have found that when other clays were coated with the same surfactants we employ in producing our novel conditioning agent, the resultant coated clays did not adhere to the fertilizer granules as does the coated kaolin clay of this invention. It is believed that the unique platy shape of the kaolin clay accounts for this phenomenon and contributes to the effectiveness of the coated clay as a conditioning agent.

As mentioned, the clay we employ is kaolin clay, by which is meant a naturally occurring clay containing as its chief mineral constitutent a hydrous aluminum silicate of the approximate empirical formula $Al_2O_3 \cdot 2SiO_2 \cdot 2H_2O$. The term "kaolin clay" does not encompass a single mineral species but includes distinct minerals such as kaolinite, nacrite, dickite, anauxite and certain halloysites, all described by the formula given above. The kaolin clay minerals have a hexagonal platy configuration which, among other properties, distinguishes this clay from other clays such as the bentonites and attapulgite clay. Also, the base-exchange capacity of kaolin clay is low, typically 3 to 10 meg./100 gm. of clay as compared with base-exchange capacities of 60 or more for the bentonites and about 25 for attapulgite clay.

More specifically, the preferred surface active agents we employ are sodium alkyl naphthalene sulfonates in which the alkyl group contains 8 to 12 carbon atoms. The corresponding potassium and lithium salts of the aforementioned sulfonates may be employed although the sodium salt is preferred because of its ready availability. Corresponding alkyl benzene sulfonate salts should also be useful. Methods of producing synthetic detergents of the class of alkali metal salts of alkylaryl sulfonates are described in Kirk Othmer's Encyclopedia of Chemical Technology, published by The Interscience Encyclopedia, Inc., vol. 13, page 522.

The kaolin clay we prefer to employ is a coarse fraction of the clay which has been obtained by separating the whole clay into a fine and coarse fraction. Whereas whole clay (which has been refined to the extent of eliminating grit and coarse agglomerates) has an average equivalent spherical diameter of about 1.5 microns (as determined by the Casagrande water sedimentation method) the clay we prefer to employ has an average equivalent spherical diameter of about 4.0 microns or more. The average equivalent spherical diameter is that size (as determined by the Casagrande method) at which 50 percent by weight of the particles are finer and 50 percent by weight are coarser. The clay should be substantially free from particles coarser than about 44 microns. Dry or hydraulic classification methods can be used to effect the desired fractionation of the clay. Such methods are well known to those skilled in the art. The coarse clay fraction is relatively inexpensive inasmuch as it is a by-product in the classification of the clay to isolate a fine clay fraction which is more useful than whole clay for many important industrial applications. In addition to being inexpensive, the coarse clay has excellent adhesion to fertilizer granules. However, whole clay or fine fractions thereof may be used.

The quantitiy of alkylaryl sulfonate we coat on the kaolin clay is usually within the range of about 3 to 10 percent of the dry clay weight. In some instances as little as about 1 percent or as much as 15 percent of alkylaryl sulfonate may be used. When appreciably less than about 3 percent of the alkylaryl sulfonate is employed, the benefits of the present invention may not be as significant as when somewhat larger quantities are employed. On the other hand, difficulty may be experienced in uniformly coating the particles of kaolin clay with more than about 10 percent by weight of alkylaryl sulfonate without impairing the free-flowing properties of the resultant coated clay.

A variety of methods may be employed in coating the clay particles with the surface active agent. Preferably, the dry clay, after crushing and pulverization, is mechanically blended with the dry powdered detergent and the mixture pulverized, as in a high speed hammer mill, to insure the uniform distribution of the detergent on the surface of the kaolin particles. This method offers the advantage of being inexpensive and obviates the expense of drying which is inherent in methods in which the coating of the clay particles is accomplished by applying a solution of the surface active agent to the clay particles. In carrying out the latter procedure, an aqueous solution or suspension of the surface active agent is uniformly incorporated in a clay slurry, the slurry dried and pulverized. Irrespective of the method of preparation, the surfactant-coated clay should be in the form of a substantially dry, free-flowing powder. The free moisture content of the coated clay should not exceed about 2 to 3 percent by weight. Free moisture (F.M.) is the weight percentage of a material which is lost when that material is heated to constant weight at 225° F.

The fertilizer salts which the coated kaolin clay particles are adapted to coat are in the form of granules or prills which are usually within the range of 5 to 35 mesh.

Our novel conditioning agent is especially applicable to the conditioning of granular fertilizer salts having a total available nitrogen analysis of 10 or more. The greatest benefits are realized when the total available nitrogen analysis is 15 or more. As examples of fertilizer substances which have an available nitrogen analysis in excess of 15 and which are especially difficult to condition may be cited: pure ammonium sulfate (21% N), urea, sodium nitrate, ammonium nitrate; also, certain mixed fertilizers containing urea salts and/or water-soluble ammonium salts such as the sulfate or chloride. Mixed fertilizers having an analysis of 10–0–10, while benefited by conditioning, are not as prone to cake as a 12–0–12 mixed fertilizer. As the available nitrogen nutrient content of the mixed fertilizer increases above about 15, most conditioning agents lose much of their effectiveness. However, very small quantities of our novel conditioning agent have been effectively used in conditioning 16–8–8 granules and 20–0–20 granules.

The fertilizer granules are coated in accordance with the present invention before they are stored. The quantity of coated clay we apply to the fertilizer granules is usually about 1 percent of the weight of the granules. In some instances ½ percent will suffice, whereas when severe conditions are expected to be encountered during storage as much as 2 percent will be used.

The method of conditioning the fertilizer granules with the surfactant-coated clay is simple and entails merely tumbling the dry granules and previously coated dry clay in a suitable rotary vessel.

We are aware of the fact that the prior art teaches that some fertilizer salts may be conditioned by coating with surface active agents. The efficacy of the surface active agents or conditioners depends on the uniform distribution of this material directly on the fertilizer particles. Inasmuch as very small quantities of these substances are employed, such as 0.005 to 0.05 percent of the weight of the fertilizer, it is very difficult to obtain the desired uniform particle coating. Solvent spraying techniques are employed and appropriate spraying and drying equipment must be available to practice this technique. Most of the surfactant conditioning agents have limited water solubility and must be sprayed in the form of relatively dilute solutions to preclude solidification which would clog spraying devices. As a result, relatively large quantities of water must be evaporated from the treated granules, and with some fertilizer granules, especially those very high in available nitrogen content, difficulty is experienced in preventing the solution of the granules during the treatment with solution of the surface active agents. Although our novel clay conditioning agent contains a surfactant, such difficulties are obviated in applying our conditioning agent to fertilizer granules.

Experiments were conducted to demonstrate the effectiveness of alkylaryl sulfonate coated kaolin clay as a conditioning agent for various granular high nitrogen analysis mixed fertilizers. The commercial fertilizer granules used in the study were 20–0–20, 10–10–10, 16–8–8 and 8–8–16. The coated kaolin clay conditioning agent was produced by blending dry ASP 400, a coarse fraction of water-washed Georgia kaolin clay having a free moisture content of 0.2 percent by weight, with 3, 5 and 10 percent by weight Petro AG, which is the sodium salt of an alkyl naphthalene sulfonate in which the alkyl group is understood to contain eleven carbon atoms. The particle size distribution (weight basis) of ASP 400 is approximately as follows: 100% minus 325 mesh, 75% minus 9 microns, 50% minus 4.8 microns, and 20% minus 2 microns. The blend was then milled in a high speed hammer mill to effect the uniform coating of the sodium alkyl naphthalene sulfonate on the clay particles. The fertilizer granules were coated with the kaolin clay which had been treated with the sodium alkyl naphthalene sulfonate in the manner described above by tumbling the dry granules with 1 percent by weight of the coated clay. The tumbling was carried out in a rotary drum at an ambient temperature of about 70° F. and was continued until all of the clay adhered to the granules.

For the purpose of comparison, samples of each of the aforementioned granules were tumbled with 1 percent by weight of uncoated kaolin clay (ASP 400). The various clay conditioned fertilizer granules of the composition reported in the accompanying table, as well as untreated control granules, were tested for resistance to caking during storage in the following manner. Two hundred gram samples of replicas of each of the fertilizer granules were placed in sealed manila paper bags and the bags were each stored for a month under a pressure of 5 p.s.i.g. at an average relative humidity of 50 percent. During the storage peirod the air temperature fluctuated between 50° F. and 70° F. These storage conditions are considered to be highly conducive to fertilizer caking and are more severe than conditions normally encountered in fertilizer storage.

The results are reported in the accompanying table.

The results of the caking tests show that the kaolin clay coated with 5 or 10 percent sodium alkyl naphthalene sulfonate was effective in preventing hard caking of all fertilizer granules, including those granules having an available nitrogen analysis of 16 and 20 parts by weight and which normally presented a severe caking problem. Kaolin clay coated with only 3 percent of the sulfonate was effective in conditioning the 8–8–16 mixed fertilizer granules. Granules having an available nitrogen analysis of 10 or more caked when conditioned with this agent.

It was found that 1 percent kaolin clay coated with Petro AG at the 5 and 10 percent levels was as effective in conditioning the 20–0–20, 10–0–10, 8–8–16 and 16–8–8 granules as was diatomaceous earth at the level of 3 percent by weight.

The granules were also subjected to a crusting test, the results of which are indicative of the caking tendencies of fertilizer granules. In carrying out the crusting test, samples of fertilizer granules were exposed to 60 percent R.H. at 70° F. for a month in open piles and checked for surface crusting at intervals. The granules tested were those employed in the caking test above and identified in the table. It was found that all of the unconditioned granules exhibited surface crusting at the end of the month. Of the granules conditioned with uncoated kaolin clay, there was extensive crusting on all samples except the 8–8–16 granules, in which there was slight crusting. At the end of the month there was no surface crusting of any granules conditioned with kaolin clay coated with the sodium alkyl naphthalene sulfonate at the 3, 5 and 10 percent levels.

TABLE

*Caking tendency of mixed fertilizer granules*

| Fertilizer Granules | Condition of Granules after Storage Under 5 p.s.i.g. at 50% R.H.[1] | | | |
|---|---|---|---|---|
| | 16-8-8 | 8-8-16 | 10-0-20 | 10-10-10 |
| Conditioning Agent: | | | | |
| None | Very hard cake | Hard cake | Very hard cake | Hard cake. |
| Kaolin Clay (uncoated) | do | do | do | Do. |
| Kaolin Clay, 3% Petro AG | Hard cake | Soft cake | Hard cake | Do. |
| Kaolin Clay, 5% Petro AG | Soft cake | do | Soft cake | Do. |
| Kaolin Clay, 10% Petro AG | do | do | do | Soft cake. Do. |

[1] The following criteria were employed in evaluating caking tendencies: Hard cake—drops to floor from height of 3 ft. without breaking. Soft cake—friable, regranulated by dropping to floor from height of 3 feet.

We claim:

1. A method for treating fertilizer granules to prevent the tendency of said granules to cake on storage in humid atmospheres which comprises tumbling dry granules of hydroscopic fertilizer salt material having an available nitrogen analysis of at least 10 with from ½ to 2 percent by weight of kaolin clay, the particles of which had been coated with from 1 to 15 percent by weight of a sodium alkylaryl sulfonate having from 8 to 12 carbon atoms in the alkyl group until said coated clay adheres to the surface of said granules.

2. A method for treating fertilizer granules to prevent to tendency of said granules to cake on storage in humid atmospheres which comprises tumbling dry granules of hygroscopic fertilizer salt material having an available nitrogen analysis of at least 10 with from ½ to 2 percent by weight of dry koalin clay, the particles of which had been coated with from 3 to 10 percent by weight of a sodium alkyl naphthalene sulfonate having from 8 to 12 carbon atoms in the alkyl group until said coated clay adheres to the surface of said granules.

3. A method for treating fertilizer granules to prevent the tendency of said granules to cake when they are stored in a humid atmosphere which comprises tumbling dry solid granules of fertilizer salt material having an available nitrogen analysis of at least 10 with from about ½ to 2 percent by weight of a free-flowing powder material until said pwoder material adheres to the surface of the granules, said powder material consisting of kaolin clay, the particles of which have previously been coated with from 1 to 15 percent by weight of a sodium alkylaryl sulfonate by dry blending said clay and said sulfonate and pulverizing the blend thereof.

4. The method of claim 3 in which said sulfonate contains at least 8 carbon atoms in the alkyl group.

References Cited in the file of this patent
UNITED STATES PATENTS

| | | |
|---|---|---|
| 2,284,002 | Lontz | May 26, 1942 |
| 2,614,917 | Zuckel et al. | Oct. 21, 1952 |
| 2,702,747 | Studebaker | Feb. 22, 1955 |
| 2,720,446 | Whetstone et al. | Oct. 11, 1955 |
| 3,034,858 | Vives | May 15, 1962 |

UNITED STATES PATENT OFFICE
CERTIFICATE OF CORRECTION

Patent No. 3,169,053                        February 9, 1965

Edgar W. Sawyer, Jr., et al.

It is hereby certified that error appears in the above numbered patent requiring correction and that the said Letters Patent should read as corrected below.

Column 2, line 67, for "uniformly" read -- Uniformly --; column 3, lines 5 and 6, for "rerain" read -- remain --; columns 5 and 6, in the table, sub-heading to the fourth column, for "10-0-20" read -- 20-0-20 --; column 5, line 73, for "manila" read -- Manila --; column 6, line 66, for "to", first occurrence, read -- the --; column 7, line 6, for "pwoder" read -- powder --.

Signed and sealed this 29th day of June 1965.

(SEAL)
Attest:

ERNEST W. SWIDER
Attesting Officer

EDWARD J. BRENNER
                                               Commissioner of Patents